Feb. 7, 1950 J. R. BRANDT 2,496,438
STACKING DEVICE
Filed July 20, 1948 2 Sheets-Sheet 2
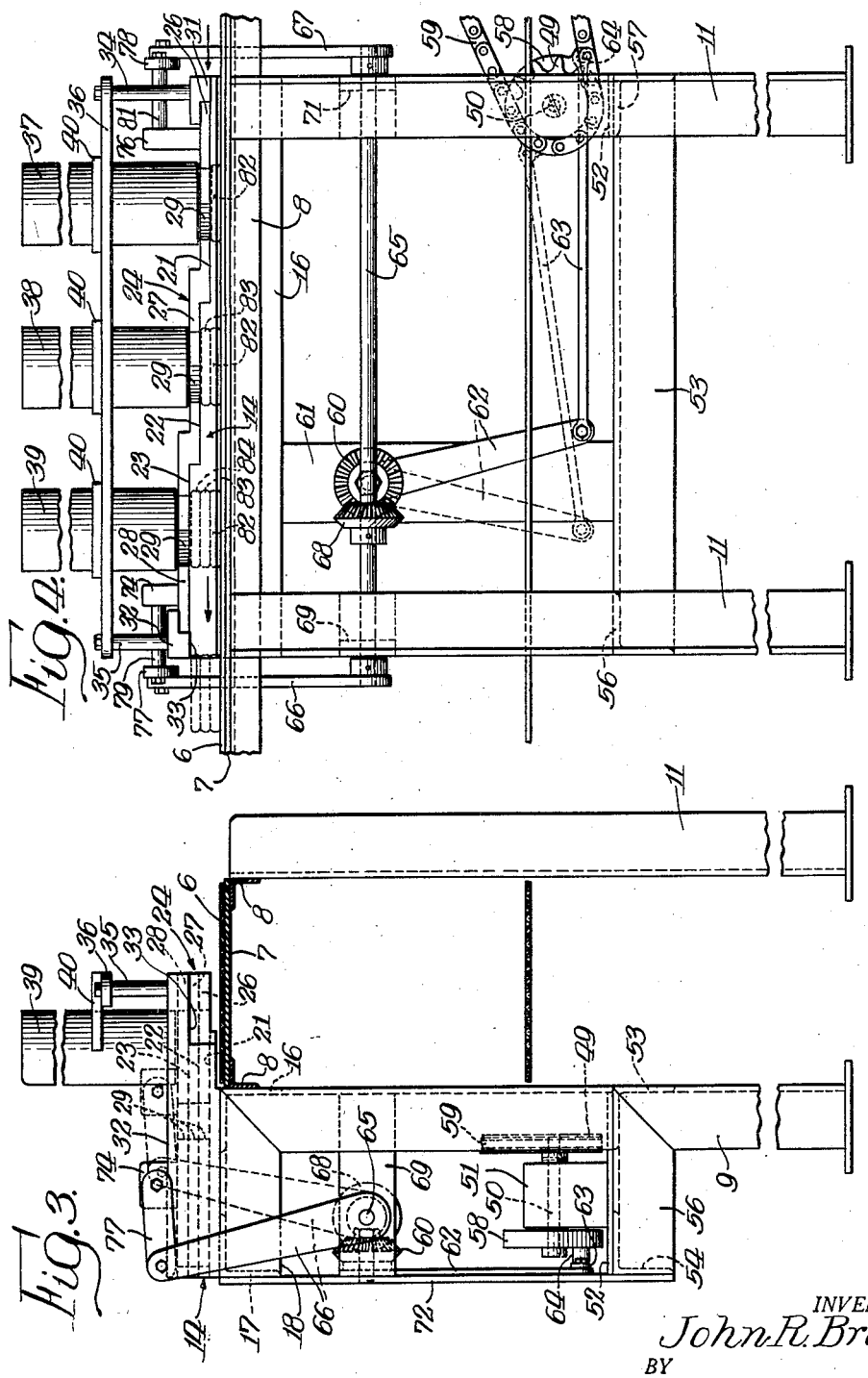
INVENTOR.
John R. Brandt,
BY
Davis, Lindsey, Hibben + Noyes
Attys.

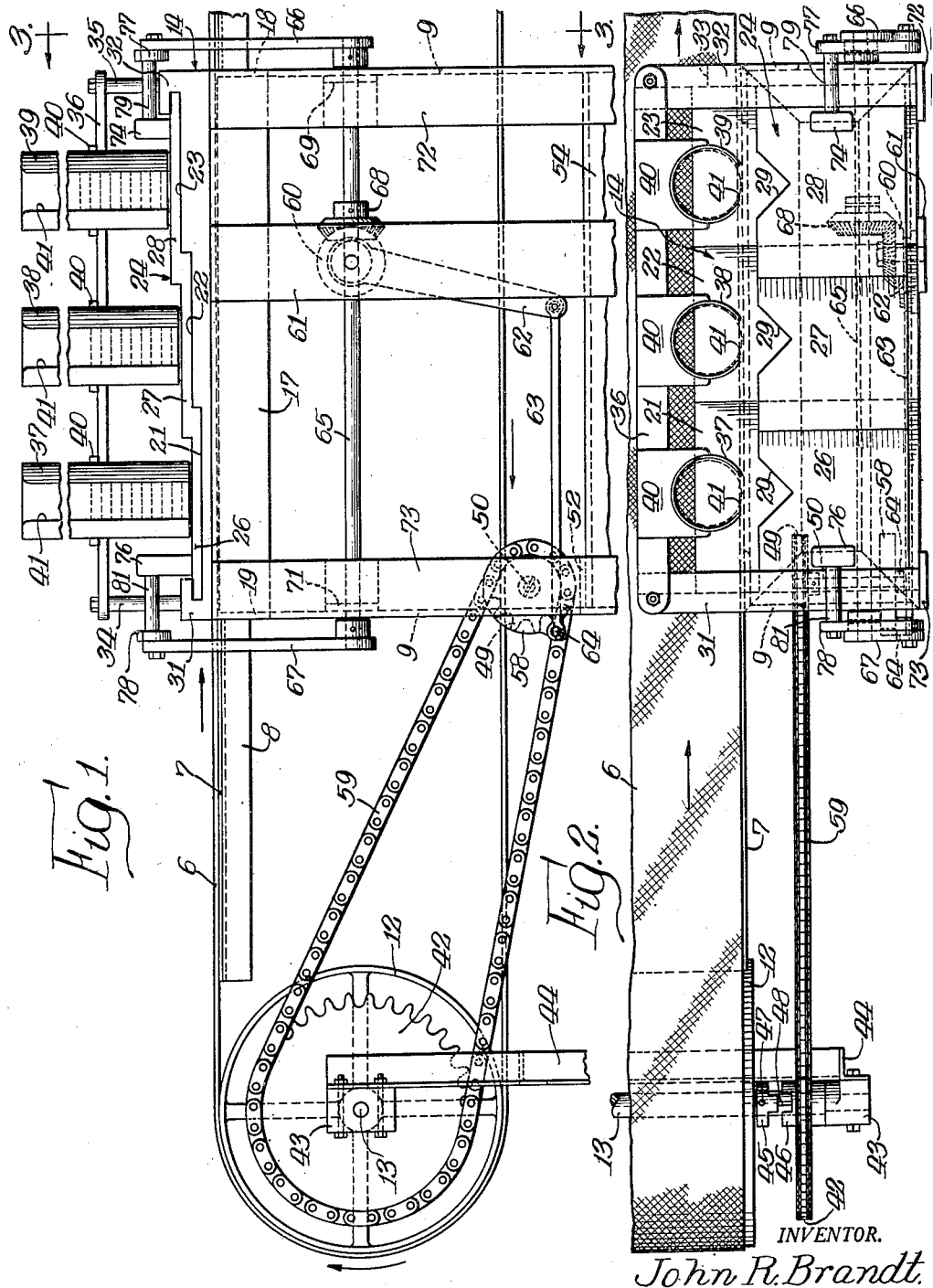

Patented Feb. 7, 1950

2,496,438

UNITED STATES PATENT OFFICE 2,496,438

STACKING DEVICE

John R. Brandt, Chicago, Ill., assignor to Salerno Machinery Company, Chicago, Ill., a corporation of Illinois Application July 20, 1948, Serial No. 39,670

10 Claims. (Cl. 198—35)

This invention relates to devices for feeding articles onto a conveyor and more particularly to a device for stacking small flat articles, such as cookies, crackers, and the like, on a horizontal conveyor.

In the loading and packaging of certain types of relatively small flat articles, including baked products and confectionery items such as cookies, crackers, wafers, etc., it is often desirable to fill individual containers with several different varieties of articles. For example, in restaurants and soda fountains when beverages such as coffee, hot chocolate, milk drinks, and the like are served, it is common practice to serve with the beverage a small paper package containing several different varieties of cookies or crackers.

Loading and packaging devices heretofore available have not been adapted for loading containers with a variety of cookies, and it has been necessary to carry out such procedures by predominantly manual loading techniques. In one such method, three containers or bins containing bulk supplies of three different types of cookies were provided and it was necessary for a packaging operator to remove by hand one cookie from each container, form a stack of the three cookies, and insert the stacked cookies manually into a glassine or cellophane bag. Even though skilled packaging operators often became quite adept at carrying out such multiple manual operations, it will be apparent that this method was tedious, time consuming, and inefficient. In addition, such methods necessitated excessive handling by the packaging operator of every cookie.

A primary object of the present invention is to provide a device for mechanically stacking flat articles to facilitate packaging of the same.

A further object of the invention is to provide a device for use in loading containers with a plurality of different articles, such as different varieties of cookies or crackers, by means of which the number of manual operations required is substantially reduced.

Another object of the invention is to provide a device which mechanically stacks a plurality of different types of small articles, such as cookies or crackers, to permit loading of the stacks into containers by substantially a single manual operation.

Still another object of the invention is to provide a device for use in conjunction with a conveyor by means of which a plurality of different types of articles, such as different varieties of cookies or crackers, are loaded onto the conveyor in stacked condition, each stack containing one of each of the different types.

An additional object of the invention is to provide a reciprocating loading device for use in combination with a conveyor by means of which a plurality of different types of articles, such as different varieties of cookies or crackers, are loaded intermittently onto the conveyor, the speed of the conveyor being correlated with the operation of the loading device so that the articles are loaded in stacked condition and each stack contains one of each of the different types.

A still further object of the invention is to provide a reciprocably operatable loading device for loading and stacking different varieties of small articles onto a conveyor, the reciprocating means for said loading device being operably connected to the driving means for said conveyor.

Other objects and advantages of the invention will become evident from the following detailed description of the invention and the accompanying drawings, in which:

Fig. 1 is a front elevational view of one specific form of the loading device of the present invention showing its location and operating connections adjacent one end of a belt conveyor;

Fig. 2 is a top plan view of the device shown in Fig. 1 with a portion of the conveyor belt broken away;

Fig. 3 is an end view of the device taken along the line 3—3 of Fig. 1 with the conveyor belt shown in transverse cross-section; and Fig. 4 is a rear elevational view showing the opposite side of the loading device with portions of the conveyor belt and driving structure being broken away.

In general, the loading device of the present invention comprises a battery of article containers adapted to feed articles one at a time in spaced relation onto a stationary bed, and a reciprocable ejector movably mounted on the bed for intermittently displacing the spaced articles laterally from the bed. The device is adapted to be mounted above a substantially horizontal moving conveyor onto which the articles are displaced from the stationary bed. The articles from the individual feeders are stacked on the conveyor by providing stepped portions in the stationary bed so that successively spaced articles are displaced from the bed at increasing elevations above the conveyor in the direction of its movement.

Referring now to the drawings, one form of the loading and stacking device comprising the present invention is illustrated, merely by way of example, as arranged for use in cooperation with a horizontal conveyor comprising an endless conveyor belt 6 supported for movement in a horizontal plane by means of an underlying elongated flat table 7. The table 7 is supported along its longitudinal edges by a pair of spaced parallel angle irons or brackets 8 which are secured to the upper ends of a plurality of upright angle irons comprising front legs 9 and rear legs 11. The conveyor is operated by means of a driving pulley 12, around which the belt 6 passes, which is mounted on a shaft 13 operably connected to a driving unit such as an electric motor (not shown). The belt 6 also passes around a supporting pulley (not shown) at the opposite end of the conveyor.

Overhanging one edge of the belt 6 and extending laterally therefrom is a stationary bed or base plate, indicated generally at 14, which is supported on a horizontal supporting structure secured to and extending outwardly from the front legs 9 and formed from a plurality of interconnected angle irons 16, 17, 18 and 19. The upper portion of the bed 14 is provided with a plurality of stepped flat surfaces 21, 22 and 23 which are arranged at progressively increasing elevations above the conveyor belt 6 in the direction of movement of the belt as indicated by the arrows in Figs. 1, 2 and 4. In other words, in the view shown in Fig. 1, the lowermost surface 21 is located at the lefthand end of the bed 14 adjacent the incoming portion of the belt 6, and the uppermost surface 23 is located at the righthand end of the bed 14 adjacent the outgoing portion of the belt 6.

An article ejector element or plate, indicated generally at 24, having stepped portions 26, 27 and 28 adapted to conform to the stepped surfaces 21, 22 and 23, respectively, of the bed 14, is shiftably disposed on the bed 14 for reciprocating transverse sliding movement thereon. Each of the stepped portions or areas 26, 27 and 28 in the ejector 24 is provided with an edgewise V-shaped notch 29 adapted to engage and position a flat article as more fully described hereinafter in connection with the operation of the device. Upright flanged portions or grooved guideways 31 and 32 are provided at opposite ends of the bed 14 for receiving and guiding the ends of the ejector 24 during reciprocating movement thereof. The guideways 31 and 32 project outwardly over the belt 6 beyond the stepped bottom portion of the bed 14, as best seen in Figs. 2 and 3, and the outer end of the guideway 32 adjacent the outgoing portion of the belt 6 is notched out or cut away, as at 33 (Fig. 3), to provide the necessary clearance for the stacked articles as hereinafter described in greater detail.

A pair of supports or standards 34 and 35 extend upwardly from the guideways 31 and 32, respectively, at opposite ends of the loading and stacking device and a cross member or bar 36 is secured therebetween. A plurality of cylindrical article chutes or feeders 37, 38 and 39 having open top and bottom portions are mounted in spaced relationship along the bar 36 by means of a plurality of supporting plates or holders 40 secured to the bar 36 and projecting laterally therefrom. A vertical slot or opening 41 is provided in the side wall of each of the feeders 37, 38 and 39 to permit observation of the contents thereof and to facilitate loading through the open top portion or inlet thereto. As shown in Figs. 2 and 3, the cylindrical feeders 37, 38 and 39 are disposed vertically over the stepped surfaces 21, 22 and 23, respectively, with a portion of each feeder extending outwardly in a horizontal plane from the edge of the bed 14 and overlying the belt 6, whereby articles may be fed downwardly from the feeders 37, 38 and 39 through the open bottom portions or outlets thereof and received flatwise on the surfaces 21, 22 and 23 with a portion of each article projecting slightly beyond the longitudinal edge of the bed and overhanging the moving belt 6.

A sprocket wheel 42 is loosely mounted at one end of the drive pulley shaft 13 which is journalled in a bearing 43 secured to an upright support 44. A suitable clutch, indicated in Fig. 2 at 45 and 46, is provided for engaging and disengaging the sprocket wheel 42 with the rotating drive shaft 13, the clutch member 45 being slidably mounted on the shaft 13 by engagement of a pin 47 in a longitudinal slot 48 in the shaft 13, and the clutch member 46 being loosely mounted on the shaft 13 and secured to the sprocket wheel 42. Manual means (not shown) may be operably connected to the slidable clutch member 45 to effect clutching and declutching movement thereof. Another sprocket wheel 49 of reduced diameter is secured to one end of a shaft 50 which is supported for rotating movement in a bearing or journal box 51 mounted on a horizontal supporting structure extending outwardly from the legs 9 and comprising a plate 52 and interconnected angle irons 53, 54, 56 and 57. An eccentric member 58 is keyed to the opposite end of the shaft 50 for rotating movement therewith, and the sprocket wheel 42 is operably connected to the sprocket wheel 49 by means of a driving chain 59 for rotating the eccentric member 58.

A bevel gear 60 is journalled in a vertical plate 61 extending between the angle irons 17 and 54. Rigidly secured to the gear 60 is a depending arm 62 which is operably connected to the eccentric member 58 through a link 63 pivotally attached at its ends to the eccentric member 58 by means of an eccentrically mounted projection 64 and to the lower end of the arm 62. An elongated rock shaft 65, having a pair of upstanding rocker arms 66 and 67 rigidly secured to its opposite ends and having a bevel gear 68 mounted thereon in engagement with the gear 61, is supported for oscillating movement by means of a pair of lateral supporting plates 69 and 71 extending between the legs 9 and a pair of vertical plates 72 and 73 disposed opposite the legs 9.

A pair of upright posts or lugs 74 and 76 are secured to opposite ends of the stepped ejector plate 24 and are operably connected to the rocker arms 66 and 67, respectively, by means of a pair of pivotally affixed transverse link members 77 and 78 and longitudinal connecting shafts 79 and 81.

The operation of the device will now be described in detail as employed for stacking different varieties of cookies, although it will be understood that the device may also be utilized for stacking other kinds of relatively small flat articles.

The operator, standing preferably on the side of the belt seen in Fig. 1, i. e. to the left of the belt as seen in Fig. 3, loads the chutes or feeders 37, 38 and 39 manually as required by inserting through the open top of each feeder a plurality of stacked or vertically aligned cookies, each of the feeders being filled with a different variety of cookie. As the belt 6 moves in the direction indicated by the arrows in the drawings, the rotary movement of the driving pulley 12 and the sprocket wheel 42 is converted to reciprocating motion by means of the eccentric member 58 which in turn effects oscillation or rocking of the shaft 65 through the connections 62 and 63 and the gears 60 and 68. The rockers arms 66 and 67, being mounted on the shaft 65 and being operably connected to the lugs 74 and 76, impart reciprocating movement to the ejector 24 which thereby slides transversely back and forth across the stationary bed 14 for intermittently extending between the feeder outlets and the bed 14 and thereby displacing cookies from the bed onto the moving belt 6 as described below.

When the ejector 24 is in retracted position, as indicated in full lines in the drawings and best seen in Fig. 3, a single cookie is fed downwardly by gravity from the open bottom portion or outlet of each of the feeders 37, 38 and 39, and the three cookies thus discharged are received flatwise on the stepped surfaces 21, 22 and 23 of the stationary bed 14 with a portion of each cookie overhanging the belt 6 as previously described. The vertical distance or clearance between the outlet from each of the feeders and the corresponding stepped surface of the bed 14 thereunder is such that only a single cookie is received upon each of the stepped surfaces, or in other words the aforementioned vertical distance is in each case only slightly greater than the thickness of the particular type of cookies being handled but not great enough to permit more than one cookie to clear the lower end of each cylindrical feeder.

Upon movement of the ejector 24 from retracted or article-feeding position into ejecting or displacing position, as shown particularly in broken lines in Fig. 3, the flat upper surfaces of the stepped ejector 24 seal off or close the outlets of the feeders 37, 38 and 39 and the three cookies disposed on the stepped surfaces 21, 22 and 23 are engaged edgewise by the V-shaped notches 29 along the longitudinal inner edge of the ejector and are displaced laterally from the bed 14 and in longitudinally spaced relationship onto the moving belt 6 disposed thereunder. The notches 29 in the ejector 24 serve not only to engage the cookies for ejecting the same but also function to position the cookies horizontally thereby insuring and maintaining the desired longitudinally spaced relation between the individual cookies during displacement thereof onto the belt 6.

Inasmuch as the cookie-receiving surfaces 21, 22 and 23 of the bed 14 are arranged at progressively increasing elevations above the belt 6, the elevation increasing in the direction of movement of the belt, it will be apparent that the cookies are therefore displaced onto the belt 6 at correspondingly increasing levels above the belt. The vertical distance or height of each of the stepped surfaces 21, 22 and 23 above the belt 6 increases from one level to the next by approximately the thickness of one cookie. Thus, the elevations of the surfaces 21, 22 and 23 above the belt 6 are equivalent substantially to the heights of stacks of cookies containing one, two and three cookies, respectively.

Referring now to Fig. 4, in which view the belt 6 is depicted as moving from right to left, a typical cookie stacking operation is depicted schematically for the sake of clarity. In one ejecting movement of the ejector 24, a cookie 82, previously discharged from the feeder 37 onto the surface 21, is displaced from the surface 21 and drops onto the belt 6. During the subsequent retraction of the ejector 24, the belt 6 advances the cookie 82 so that it is in front of the feeder 38 from which a cookie 83, of a different variety, is fed onto the bed surface 22. Then in the next consecutive ejecting movement of the ejector 24, the cookie 83 is displaced from the surface 22 at a higher level and slides off on top of the bottom cookie 82. Similarly, during the next retracting and ejecting sequence of the ejector 24, the stack of cookies 82 and 83 is advanced further to the left by the belt 6 and a cookie 84, of a still different variety, is fed from the feeder 39, displaced from the surface 23, and deposited on top of the cookie 83 thereby forming a stack of three cookies each of a different variety. The stack of cookies 82, 83 and 84 is then carried by the conveyor belt 6 away from the loading and stacking apparatus and through the cut-away portion 33 in the guideway 32.

Thus, during each operating cycle of the ejector 24, three varieties of cookies are displaced simultaneously from the stationary bed 14 at different elevations above the belt 6 and in regulated longitudinal spacing along the belt 6. At all times, the feeder 37 provides the bottom cookie of each stack, the feeder 38 supplies the middle cookie of the stack, and the feeder 39 furnishes the top cookie for the stack. As the cookies are stacked continuously on the moving belt 6, the stacks may be removed in a simple manual operation by packaging operators, standing downstream from the stacking device, and quickly inserted in suitable bags or other containers.

An important feature of my invention is in the correlation of the driving means for the belt 6 and the reciprocating mechanism for the ejector 24 with the speed of the belt. The ratio of the diameters of the sprocket wheels 42 and 49 and the longitudinal spacing between the feeders 37, 38 and 39 are selected and correlated so that for each cycle of reciprocating movement of the ejector 24, the belt 6 is advanced a distance corresponding to the spacing between the feeders. Thus, at a predetermined belt speed, the cookie deposited in each cycle by the feeder 37 will be advanced by the belt 6 in timed relation to the operation of the ejector and will be aligned with the feeder 38 in time to receive a second cookie in accurately stacked alignment thereon. Similarly, the stack of two cookies leaving its position in front of the feeder 38 will be advanced by the belt 6 in time to receive from the feeder 39 a third cookie in stacked alignment thereon. In the event the belt moves at a slow rate of speed, the ejector will likewise move at a slow rate of speed, and fast operation thereof will effect fast operation of the ejector, the operation of the mechanism being truly synchronized.

By the use of the device of the present invention, it is only necessary for the packaging operator to fill the cookie feeders at intervals as required and to remove the stacked cookies continuously from the moving belt for manual insertion into bags or other containers, thereby greatly simplifying and minimizing the number of manual operations as compared with the loading methods previously employed. In fact, in a typical factory installation of my stacking device it has been possible for fewer employes to greatly increase the output of packaged cookies as compared with strictly manual stacking and loading techniques.

Although the invention has been described herein with particular reference to the stacking and loading of cookies and with respect to one specific form of the stacking device, it will be understood that the device is equally well adapted for handling other types of relatively small flat articles, and it is also intended that various modifications and equivalent structures may be employed without departing from the scope of the invention as defined in the appended claims.

I claim:

1. A device of the character described comprising a stationary article-receiving bed adapted to be disposed adjacent a conveyor longitudinally thereof and having a plurality of stepped surfaces spaced in the direction of movement of the conveyor, means for feeding an article onto each of said stepped surfaces, and movable ejector means supported for reciprocal movement relative to the said stepped surfaces for engaging and displacing articles from said surfaces onto the conveyor.

2. A device of the character described comprising a stationary article-receiving bed adapted to be disposed adjacent a conveyor longitudinally thereof and having a plurality of spaced, stepped surfaces arranged in progressively increasing elevations above the conveyor in the direction of movement thereof, means for feeding an article onto each of said stepped surfaces, and movable ejector means supported for reciprocal movement relative to the said stepped surfaces for engaging and displacing articles from said surfaces onto the conveyor.

3. A device of the character described comprising a stationary article-receiving bed adapted to be disposed adjacent a conveyor longitudinally thereof and having a plurality of stepped surfaces arranged in progressively increasing elevations above the conveyor in the direction of movement thereof, the lower stepped surface being slightly higher than the upper surface of the conveyor and the differences in elevations between the respective stepped surfaces being no less than the thicknesses of the articles, means for feeding an article onto each of said stepped surfaces, and movable ejector means supported for reciprocal movement relative to the said stepped surfaces for engaging and displacing articles from said surfaces onto the conveyor.

4. A device of the character described comprising a stationary article-receiving plate adapted to be disposed adjacent a conveyor longitudinally thereof and having a plurality of stepped surfaces, a plurality of article feeders mounted above said plate, each of said feeders being adapted to discharge articles onto one of said surfaces, and a stepped ejector plate slidably supported over said stationary plate and reciprocably movable relative thereto for displacing articles laterally therefrom onto the conveyor.

5. A device of the character described comprising a stationary article-receiving bed adapted to be disposed adjacent a conveyor longitudinally thereof and having a plurality of substantially flat parallel surfaces arranged in progressively increasing elevations above the conveyor in the direction of movement thereof, a plurality of article containers mounted above said bed, each of said containers having a discharge outlet adapted to feed articles onto one of said surfaces, and a reciprocable ejector plate having a plurality of stepped surfaces conforming to said surfaces of said bed and slidably disposed thereon for displacing articles laterally therefrom onto the conveyor.

6. A device of the character described, comprising a plurality of article feeders adapted to be mounted adjacent a substantially horizontal conveyor, said feeders being arranged in longitudinally spaced relationship with respect to the movement of said conveyor, a stationary article-receiving bed disposed below said feeders and having a plurality of stepped surfaces of increasing elevation in the direction of movement of said conveyor, each of said surfaces being adapted to receive articles flatwise from one of said feeders, and a reciprocable ejector plate movably disposed on said bed and having stepped surfaces conforming to the stepped surfaces of said bed, said ejector plate being reciprocable transversely on said bed for engaging edgewise the articles fed onto said bed and displacing the same laterally from said bed onto the conveyor.

7. A loading device for loading flat articles in stacked condition onto a substantially horizontal conveyor, comprising a plurality of upright article feeders disposed above the conveyor in longitudinally spaced relation with respect to the direction of movement of the conveyor, said feeders having outlets at their lower portions for permitting gravity discharge of articles therefrom, a stationary article-receiving bed disposed below said outlets and having a plurality of stepped flat surfaces arranged in increasing elevation at a higher level than the conveyor in the direction of movement thereof, each of said surfaces being adapted to receive an article flatwise thereon from one of said feeders, a movable ejector plate mounted for reciprocating transverse movement over said bed and stepped to conform to the stepped surfaces of said bed, said plate being adapted for edgewise engagement with articles fed onto said bed for displacing said articles laterally onto said conveyor in longitudinally spaced relation thereon, and actuating means operably connected to said ejector plate for alternately moving the latter in between said outlets and said bed for displacing articles onto the conveyor and for withdrawing said ejector plate to permit a further quantity of articles to be discharged from said outlets onto said bed.

8. In combination, a movable horizontal belt conveyor having driving means therefor, a stationary article-receiving bed disposed adjacent said conveyor longitudinally thereof and having a plurality of stepped surfaces arranged in progressively higher elevations above the conveyor in the direction of movement thereof, means for feeding an article onto each of said stepped surfaces, movable ejector means supported for reciprocal movement relative to said stepped surfaces for engaging and displacing articles from said surfaces onto the conveyor, and actuating means for said ejector means, said actuating means being correlated with said conveyor so that the conveyor is advanced a distance equivalent to the spacing between said stepped surfaces for each cycle of the reciprocating movement of said ejector means whereby an article from one stepped surface of higher elevation may be stacked on top of an article from a lower stepped surface upon advance of said conveyor.

9. In combination, a substantially horizontal belt conveyor having driving means therefor, a plurality of article feeders disposed above said conveyor in longitudinally spaced relation with respect to the direction of movement of said conveyor, a stationary article-receiving bed disposed between said feeders and said conveyor and having a plurality of stepped flat surfaces arranged at increasing elevations above the conveyor in the direction of movement thereof, a stepped ejector member shiftably mounted for transverse movement on said bed and conforming to the stepped surfaces thereof for displacing articles laterally from said bed onto the conveyor, and actuating means for said ejector member operably connected with said driving means and synchronized therewith so that said conveyor is advanced a distance equivalent to the spacing between said feeders for each cycle of reciprocating movement of said ejector member whereby an article from one feeder may be stacked on top of an article from another feeder upon advance of said conveyor.

10. A device of the character described comprising a stationary article-receiving bed adapted to be disposed adjacent a conveyor longitudinally thereof and having a plurality of article-receiving surfaces spaced in the direction of movement of said conveyor, at least the last said surface along the path of movement of said conveyor being elevated higher than said belt a distance slightly greater than the total of the thicknesses of the articles received on said other surfaces, means for feeding articles onto each of said surfaces, and movable ejector means supported for reciprocal movement relative to said surface for engaging and displacing articles from said surfaces onto the conveyor.

JOHN R. BRANDT.

REFERENCES CITED

The following references are of record in the file of this patent:

UNITED STATES PATENTS

| Number | Name | Date |
|---|---|---|
| 1,621,301 | Wright | Mar. 15, 1927 |
| 1,673,091 | Risser | June 12, 1928 |
| 2,008,960 | Lampard | July 23, 1935 |